May 26, 1970   J. ANANIA   3,513,733
CUTTING TOOL FOR A LATHE
Filed June 11, 1968   2 Sheets-Sheet 1

INVENTOR
JAMES A. ANANIA

BY Rudolph J. Jurick
ATTORNEY

May 26, 1970     J. ANANIA     3,513,733
CUTTING TOOL FOR A LATHE
Filed June 11, 1968     2 Sheets-Sheet 2
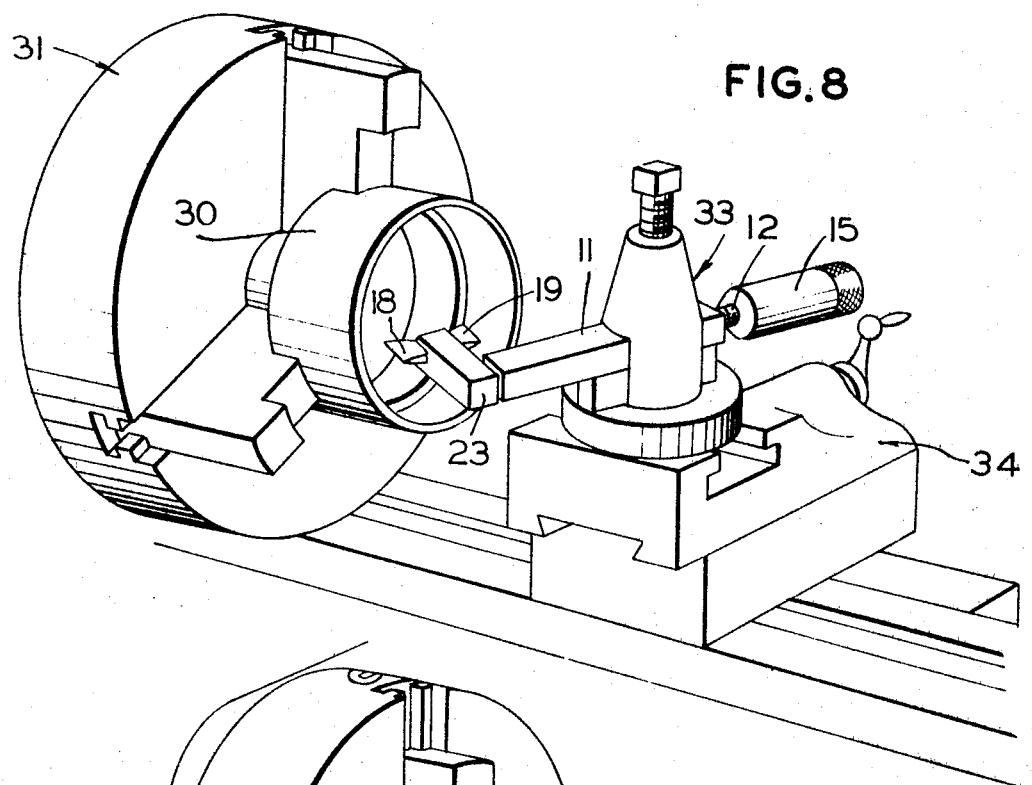
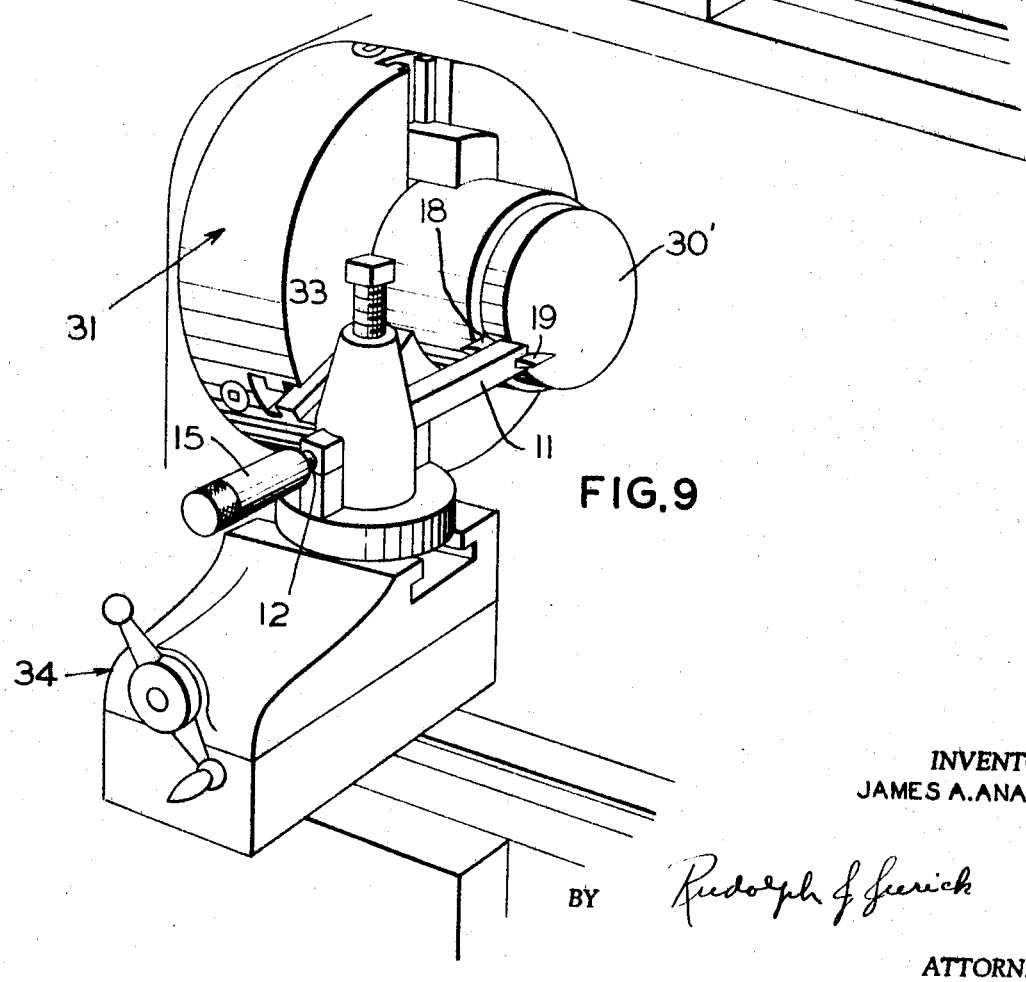
INVENTOR
JAMES A. ANANIA
BY *Rudolph J. Jurick*
ATTORNEY

United States Patent Office 3,513,733
Patented May 26, 1970

---

3,513,733
CUTTING TOOL FOR A LATHE
James A. Anania, Newark, N.J., assignor of one-half to William J. Matt, Jr., Westfield, N.J.
Filed June 11, 1968, Ser. No. 736,144
Int. Cl. B23b 29/00
U.S. Cl. 82—36          3 Claims

ABSTRACT OF THE DISCLOSURE

A cutting tool having a micrometer mechanism affording precise adjustment of the cutter tip relative to a workpiece when the tool is secured to the tool holder of a lathe.

BACKGROUND OF THE INVENTION

Cutting tools of the class to which this invention is directed comprise a hardened cutter tip carried by a tool holder which is securable to the tool post of a lathe for performing a machining operation on a workpiece. In a lathe having a simple rest, once the cutting tool is secured in a fixed position to the tool post, a calibrated adjustment of the cutter tip relative to the workpiece can be made only in a direction normal to the axis of the lathe chuck. In a lathe having a compound rest, such measured adjustment of the cutter tip can be made along a line forming a desired angle relative to the axis of the lathe chuck. In either case, it is often desirable to be able to adjust the cutter tip relative to the workpiece without changing the setting of the micrometer mechanisms associated with the lathe rest. This is made possible by a tool constructed as described hereinbelow.

SUMMARY OF THE INVENTION

The tool comprises a spindle having one end secured to a thimble and slidable in an axial hole extending through a holder, said thimble and holder being provided with cooperating threads. The other end of the spindle is mechanically-coupled to a removable member carrying a cutter tip. Cooperating markings are formed on the holder and the thimble, thereby to form a micrometer mechanism whereby rotation of the thimble relative to the holder effects a measured displacement of the cutter tip along the axis of the holder.

An object of this invention is the provision of a cutting tool comprising a cutter tip carried by a holder and incorporating a micrometer mechanism operable to effect a measured displacement of the cutter tip relative to the holder.

An object of this invention is the provision of a cutting tool comprising a spindle slidable within an axial hole extending through a holder provided with an externally threaded portion, a thimble having matching internal threads and secured to an end of said spindle, and a head carrying a cutter tip and mechanically-coupled to the spindle, said thimble and holder being provided with cooperating, calibrated graduations affording a precise adjustment of the spindle relative to the holder upon rotation of the thimble about the threaded portion of the holder.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 8 is a fragmentary, isometric view showing the tool of FIG. 1 secured to a tool rest for performing an internal boring operation; and FIG. 9 is a fragmentary, isometric view showing the tool of FIG. 7 secured to a tool rest for performing an external cutting operation.

Figure 4:
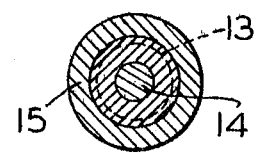
FIG. 4 is a cross-sectional view taken along the line 4—4 of FIG. 2.

Reference now is made to FIGS. 1-4 wherein there is shown a holder 10 having an end portion 11 of square, cross-sectional configuration (see FIG. 3), an intermediate cylindrical portion 12 and an externally-threaded end portion 13, see FIG. 4. A spindle 14, slidably disposed within an axial hole extending through the holder, has one end secured to a thimble 15 as by the set screw 16, said thimble having internal threads matching the external threads of the holder. The spindle has a tapered end which sweeps along the calibrated markings engraved on the intermediate portion of the holder. It will be apparent that the described arrangement constitutes a micrometer mechanism affording a measured displacement of the spindle within the holder 10 upon rotation of the thimble.

Figure 6:
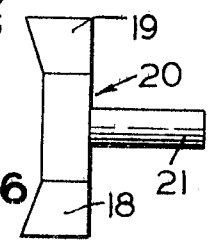
FIG. 6 is an elevational view showing the tip-carrying member.
Figure 3:
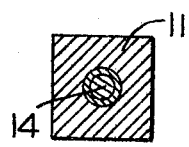
FIG. 3 is a cross-sectional view taken along the line 3—3 of FIG. 2.

Referring to FIG. 6, two cutter tips 18 and 19 are attached to a head 20, as by brazing, said head having an integral shank 21. This shank fits within an axial hole 22 extending through a rectangular adapter 23 (see particularly FIG. 7 which is a cross-sectional view taken along the line 5—5 of FIG. 1), and is secured to the adapter by a pair of set screws 24. Also formed in the adapter is a transverse hole which intersects the axial hole at a right angle and receives a rod 25, which rod is secured to the adapter by a set screw 26.

Figure 1:
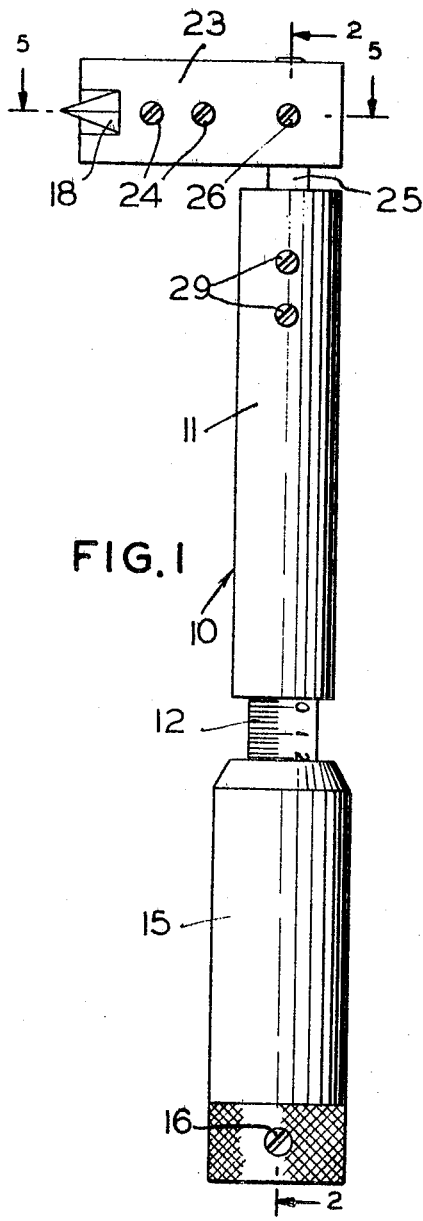
FIG. 1 is an elevational view showing a cutting tool made in accordance with this invention.
Figure 2:
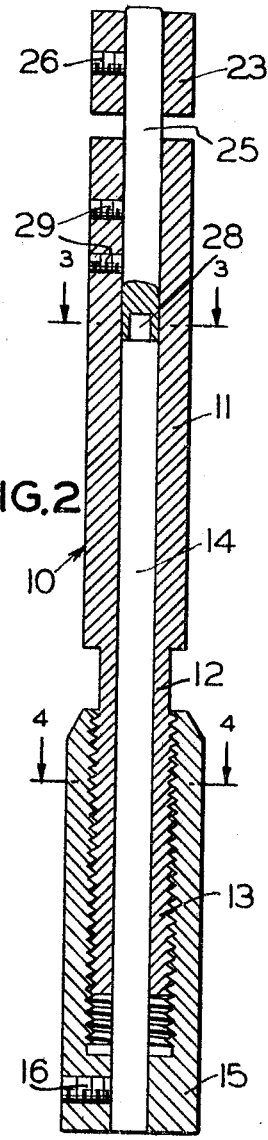
FIG. 2 is a cross-sectional view taken along the line 2—2 of FIG. 1.

The spindle 14 has a reduced-diameter end 28, see FIG. 2, which end is adapted to be force-fitted into an axial bore formed in the end of the rod 25. Thus, rotation of the thimble 15, in one or the other direction, results in a measured, linear displacement of the adapter 23 relative to the end of the holder 10. Upon effecting a desired displacement of the adapter, the latter is locked in such position by means of the set screws 29.

FIG. 8 shows the described tool secured to a lathe for performing an internal boring operation on a workpiece 30 carried by the chuck 31. The rectangular portion 12, of the tool, is clampingly secured to the tool post 33, as in the case of a conventional cutting tool, said tool post being carried by a rest, or slide 34 movable along the lathe bed. The tool is locked in place on the tool post after the desired position and cutting angle of the cutter tip 19 has been established relative to the inner wall of the work. Thereafter, the depth of the cut can be increased by a precise amount without changing the locked position of the tool on the tool post. The set screws 29, see FIG. 2, are loosened and the thimble 15 rotated relative to the calibrated markings formed on the intermediate portion 12 of the tool.

Figure 7:
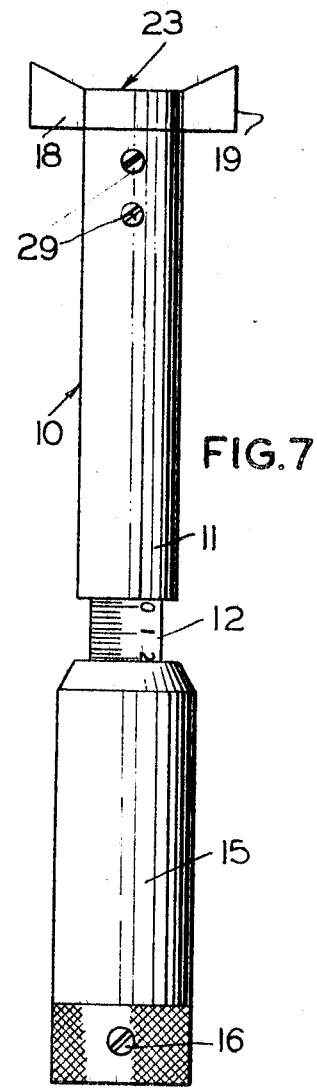
FIG. 7 is similar to FIG. 1 but showing the shank of the tip-carrying member inserted directly into the end of the holder.
Figure 5:
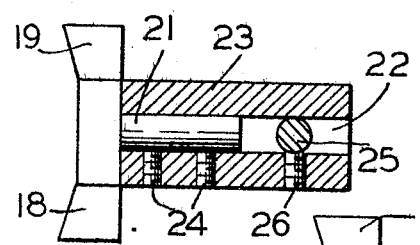
FIG. 5 is a cross-sectional view taken along the line 5—5 of FIG. 1.

When the tool is to be used for an external cutting operation, the adapter 23 is not required. The shank 21, of the head 23, is inserted directly into the axial bore of the tool, as shown in FIG. 7. Such tool is shown in FIG. 9 in work-performing position relative to the workpiece 30.

Having now described the invention, those skilled in this art will be able to make various changes and modifications without thereby departing from the scope and spirit of the invention as recited in the following claims.

I claim:
1. A cutting tool comprising,
   (a) a holder having an axial bore extending therethrough and comprising a generally-rectangular portion, an externally-threaded portion and a cylindrical intermediate portion,
   (b) a calibrated scale carried by the intermediate portion of the holder,
   (c) a thimble having internal threads in mesh with the externally-threaded portion of the holder, said thimble having an end cooperating with the said scale,
   (d) a spindle slidably disposed within the axial hole of the holder and secured to the said thimble,
   (e) a head carrying cutter tips and having a shank insertable into the said axial hole and into engagement with an end of the spindle, and
   (f) locking means for securing the said shank in fixed position relative to the said holder.

2. The invention as recited in claim 1, wherein the said locking means comprises set screws carried by the rectangular portion of the holder and having ends for engagement with the said shank.

3. The invention as recited in claim 1, in combination with an adapter having a rod insertable into the axial hole of the adapter, means forming a hole in the adapter normal to the said rod and into which the shank of the head is insertable, and set screws carried by the adapter for securing the said shank in fixed position to the adapter.

References Cited
UNITED STATES PATENTS
1,075,450  10/1913  Van Osdel _____ 82—36 XR FOREIGN PATENTS
277,396  11/1951  Switzerland.

LEONIDAS VLACHOS, Primary Examiner

U.S. Cl. X.R.
77—56